US012754130B2

(12) United States Patent
Skriba

(10) Patent No.: US 12,754,130 B2
(45) Date of Patent: Oct. 6, 2026

(54) ETENDUE-PRESERVING RAMAN SAMPLING OPTICS

(71) Applicant: Endress+Hauser Optical Analysis, Inc., Ann Arbor, MI (US)

(72) Inventor: Nicholas Skriba, Jackson, MI (US)

(73) Assignee: Endress+Hauser Optical Analysis, Inc., Ann Arbor, MI (US)

( * ) Notice: Subject to any disclaimer, the term of this patent is extended or adjusted under 35 U.S.C. 154(b) by 0 days.

(21) Appl. No.: 19/329,938

(22) Filed: Sep. 16, 2025

(65) Prior Publication Data

US 2026/0002868 A1 Jan. 1, 2026

Related U.S. Application Data

(62) Division of application No. 18/148,519, filed on Dec. 30, 2022, now abandoned.

(51) Int. Cl.

| | |
|---|---|
| ***G01N 21/05*** | (2006.01) |
| ***G01N 21/65*** | (2006.01) |
| ***G02B 3/00*** | (2006.01) |
| ***G02B 27/30*** | (2006.01) |

(52) U.S. Cl.

CPC ............. *G01N 21/05* (2013.01); *G01N 21/65* (2013.01); *G02B 3/0037* (2013.01); *G02B 27/30* (2013.01)

(58) Field of Classification Search

CPC ........ G01N 21/05; G01N 21/65; G01N 21/01; G02B 3/0037; G02B 27/30

See application file for complete search history.

(56) References Cited

U.S. PATENT DOCUMENTS

| | | | | |
|---|---|---|---|---|
| 5,377,004 | A * | 12/1994 | Owen | G02B 5/203 356/318 |
| 2012/0140215 | A1* | 6/2012 | Kao | G02B 5/124 359/530 |
| 2021/0231939 | A1* | 7/2021 | Leclerc | G02B 21/086 |
| 2022/0065792 | A1* | 3/2022 | Hong | G01N 21/658 |

* cited by examiner

*Primary Examiner* — Michelle M Iacoletti
*Assistant Examiner* — Mohamed Doumbia
(74) *Attorney, Agent, or Firm* — Mark A. Logan; Endress+Hauser (USA) Holding, Inc.

(57) ABSTRACT

Sampling optics for spectroscopic analysis include an array of optical elements as opposed to a single objective as used in conventional systems, achieving enhanced collection, inherent signal integration/averaging and improved measurement uniformity. At the same time, the etendue using the array is substantially the same as the etendue using a single-element objective. The array of closely packed optical elements may have spherical or aspherical surfaces and may be transmissive or reflective. An array of lenses and reflective elements may be arranged together in flow cell configurations and/or for signal amplification involving multiple passes through a sample medium. The array elements may be arranged in hexagonal, linear, radial or other packing geometries and may be implemented as a flat or curved panel. The present disclosure is applicable to remote fiber probes and flow cell geometries to measure solids, liquids, gasses and semi-liquid such as slurries.

8 Claims, 8 Drawing Sheets

ETENDUE-PRESERVING RAMAN SAMPLING OPTICS

CROSS-REFERENCE TO RELATED APPLICATION

The present application is a divisional application of U.S. patent application Ser. No. 18/148,519, filed on Dec. 30, 2022 of which the entire disclosure of the pending, prior application is hereby incorporated by reference.

TECHNICAL FIELD

The present disclosure relates generally to spectroscopy and, in particular, to Raman spectroscopy and, more particularly, to Raman analysis systems incorporating micro-lens and/or micro-mirror arrays for improved collection efficiency.

BACKGROUND

Induced radiation effects such as Raman scattering and fluorescence have become extremely valuable tools associated with the non-destructive determination of molecular composition. A conventional Raman analysis system generally includes three main components: a laser excitation source, sampling optics and a spectrometer. Because Raman instruments use lasers in the visible to near-infrared region of the electromagnetic spectrum, optical fibers can be used to carry the laser excitation and collect the scattered radiation from the sample. In process control and other applications, an optical probe, e.g., a Raman probe, can be inserted into a reaction or used to collect Raman spectra though a window, for example, in an external reaction sample loop or flow cell, thereby eliminating sample contamination.

FIG. 1 is a schematic diagram of a conventional fiber-based Raman probe 100. Excitation illumination is supplied to the probe 100 over fiber 102, which is then collimated by lens 104. The collimated light then passes through a band-pass filter 108 to remove non-laser wavelengths. The filtered light is reflected by a mirror 106 onto a beam combiner 120, which is then directed to a sample along a counter-propagating collimated path 122. An objective element 124 of the probe 100 focuses the beam of excitation illumination to a point on or in a sample medium 101 and recollimates scattered light from the sample 101 back into path 122, through beam combiner 120. The combined beam 122 may be filtered by a notch filter 116 to remove a portion of the scattered light having the same wavelength as the laser (e.g., the laser line) before being focused by lens 114 onto the end of a collection fiber 112.

FIG. 2 is a simplified block diagram of a conventional flow cell for Raman analysis. The laser is represented by block 202, and the spectrometer by block 204. A computer 208 may be provided to control system operation, to provide for a user interface and to receive and analyze Raman signals separated by the spectrometer, for example. Block 206 represents beam-combining optics to generate the collimated, counter-propagating, combined excitation-collection path 122. Block 206 may be fiber-coupled probe like the one depicted in FIG. 1, with the understanding that other probe configurations are possible, including direct-coupled (e.g., non-fiber) designs.

In FIG. 2, the combined beam 122 is focused by objective lens 212 to a point 214 in a conduit 216, which contains a sample to be analyzed. The conduit 216 may be a primary flow tube, process vessel, or a capillary branch from a primary tube or vessel. A reflector 220 may be provided to achieve a 'multi-pass' configuration, by which the combined beam 122 passes through the point 214, returning to the objective lens 212. While such an arrangement generates additional signal through relayed imaging, it still does not increase the solid angle of the combined beam 122.

Etendue is often referred to in relation to how 'spread out' the light in an optical system is, or conversely, the maximum 'concentration' which can be achieved under condensing conditions. Because etendue is the integrated product of the emitter area and the solid angle, in FIG. 1, the solid angle of beam 122 is assumed to be constant between the individual, optical components and the single focusing lens 124, such that a simple spot-area summation is sufficient to define the effect.

While single-lens Raman probe objectives are well-known and readily manufactured, they have drawbacks, including strict reliance on a single point or isolated sampling region. If the sample spot is temporarily or permanently disrupted for any reason, creating inconsistencies associated with flow or mixing, the target may not be an accurate representation of sample composition. As such, the need remains for optical geometries to improve signal-generation capabilities in Raman flow-cell and other signal collection configurations while, ideally, preserving system etendue.

SUMMARY

In one aspect of the present disclosure, sampling optics for a spectroscopic system incorporating a collimated beam of light, including an excitation beam and a counter-propagating collection beam, comprise: an objective optical element comprising an array of closely packed optical elements, each array optical element configured to focus a portion of the collimated beam onto or into a sample and to recollimate a portion of light received at the objective optical element from the sample such that the objective optical element is operative to focus the collimated beam onto or into the sample and to recollimate the light received from the sample, wherein a system etendue is defined with respect to the use of a single objective element, and wherein the array of closely packed optical elements is configured such that etendue contributed by the individual array optical elements yields a combined etendue that is substantially similar to the system etendue. The portions of light received from the sample and recollimated by the individual array optical elements are integrated and averaged to form the collection beam.

In at least one embodiment, the array optical elements comprise spherical surfaces. In certain embodiments, the array optical elements comprise aspherical surfaces. In further embodiments, the array of closely packed optical elements is an array of closely packed lenses or transmissive elements. In still further embodiments, the array of closely packed optical elements is an array of closely packed mirrors or reflective elements.

In at least one embodiment, the array of closely packed optical elements is an array of closely packed lenses or transmissive elements, each having an optical axis, and the sample optics further comprise an array of closely packed mirrors or reflective elements, each having an optical axis that is on-axis with a respective one of the lenses or transmissive elements of the array of closely packed optical elements. In such an embodiment, the closely packed lenses or transmissive elements may be disposed on one side of a sample volume, and the closely packed mirrors or reflective elements may be disposed on an opposing side of the sample volume. In such an embodiment, the sample volume may be within a flow cell.

In certain embodiments, the closely packed optical elements are arranged in one of the following array configurations: hexagonal, linear and radial. In further embodiments, the array of closely packed optical elements is configured as an integrated panel. In such an embodiment, the panel may be flat or curved.

In at least one embodiment, the sampling optics further comprising one or more amplifying optical elements configured to amplify the light received from the sample. In such an embodiment, the one or more amplifying optical elements may comprise an array of closely packed mirrors or reflective elements configured such that the excitation and collection beams make multiple passes through the sample.

In at least one embodiment, the objective optical element comprising the array of closely packed optical elements is integrated into a remote optical measurement probe. In further embodiments, the objective optical element comprising the array of closely packed optical elements is integrated into a flow cell.

In a further aspect of the present disclosure, a Raman measurement probe comprises: an optical input configured to receive an excitation light beam from a laser; an optical output configured to convey a collection light beam to a spectrometer; a beam-combining optical element operative to merge the excitation light beam and the collection light beam into a collimated, counter-propagating excitation-collection light beam; and an objective optical element comprising an array of closely packed optical elements, each array optical element configured to focus a portion of the collimated beam onto or into a sample and to recollimate a portion of light received at the objective optical element from the sample such that the objective optical element is operative to focus the collimated beam onto or into the sample and to recollimate the light received from the sample. In such an embodiment, a system etendue is defined with respect to the use of a single objective element, and wherein the array of closely packed optical elements may be configured such that etendue contributed by the individual array optical elements yields a combined etendue that is substantially similar to the system etendue. In at least one embodiment, the Raman measurement probe further comprises: a first optical fiber configured to convey the excitation light beam from the laser to the optical input; and a second optical fiber configured to convey the collection light from the optical output to the spectrometer.

In another aspect of the present disclosure, a Raman flow cell comprises: a conduit configured to convey a sample, the conduit including at least one sidewall transparent to wavelengths associated with Raman measurement; an objective optical element operative to focus a collimated, counter-propagating laser excitation and Raman collection light beam into the sample through the at least one sidewall and to recollimate light received from the sample through the at least one sidewall, wherein the objective optical element comprises an array of closely packed optical elements, each array optical element configured to focus a portion of the collimated beam onto or into a sample and to recollimate a portion of light received at the objective optical element from the sample. The sample is a liquid or a gas.

In at least one embodiment, the array of closely packed optical elements is an array of closely packed lenses or transmissive elements, each having an optical axis, and the flow cell further comprises an array of closely packed mirrors or reflective elements, each having an optical axis that is on-axis with a respective one of the lenses or transmissive elements of the array of closely packed optical elements. In such an embodiment, the array of closely packed mirrors or reflective elements may be immersed within the sample. IN a further embodiment, the at least one transparent sidewall extends to opposing sides of the conduit, and the array of closely packed lenses or transmissive elements and the array closely packed mirrors or reflective elements are disposed on opposing sides of the conduit, such that each corresponding pair of lenses or transmissive elements and mirrors or reflective elements focus the excitation-collection beam within the sample.

In yet another aspect of the present disclosure, in a Raman analysis system characterized in having a system etendue, and wherein a combined excitation-collection beam is directed to and from a sample, an improvement is disclosed, comprising: sampling optics incorporating an array of lenses or mirrors, each lens or mirror of the array configured to: focus a portion of the combined excitation-collection beam to a point or region of the sample; and recollimate light scattered by the point or region of the sample and to convey the recollimated light to a spectrometer, wherein the sampling optics are configured and integrated in the Raman analysis system such that substantially preserves the system etendue. In such an embodiment, the array of lenses or mirrors may be disposed adjacent to or within a sample volume of the sample.

BRIEF DESCRIPTION OF THE DRAWINGS

The described embodiments and other features, advantages and disclosures contained herein, and the manner of attaining them, will become apparent and the present disclosure will be better understood by reference to the following description of various embodiments of the present disclosure taken in junction with the accompanying drawings, wherein.

DETAILED DESCRIPTION

Figure 1:
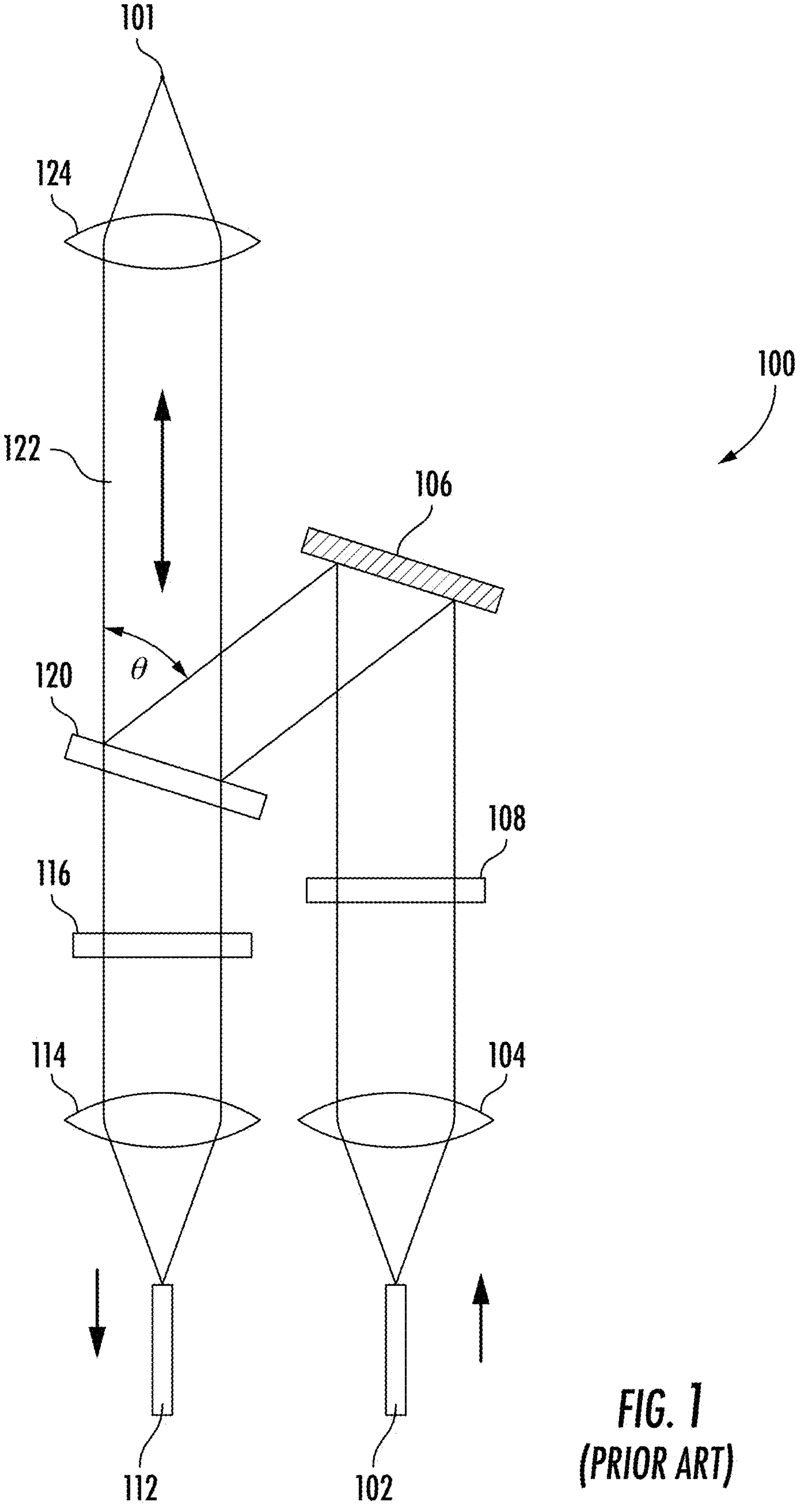
FIG. 1 (PRIOR ART)
FIG. 1 illustrates a schematic of a fiber-based Raman probe from the prior art.

In broad and general terms, the present disclosure describes systems and methods that improve upon conventional Raman analysis systems by providing sampling optics in the form of an array of optical elements, as opposed to the single objective element used in conventional systems (e.g., the objective element 124 of FIG. 1). The use of an array of optical elements offers several advantages, including enhanced collection efficiency in conjunction with an inherent integration of collected signals for improved measurement uniformity. Moreover, the etendue using an array of optical elements is substantially the same as the etendue of the system using a single lens. The excitation and collection signals are spatially separated, as defined by the array, such that the etendue associated with each element is fractionally smaller, but when summed, substantially equal the total system's etendue.

In a Raman analysis system incorporating a collimated beam of light including an excitation beam and a counter-propagating collection beam, sampling optics according to the present disclosure includes an objective implemented as an array of closely packed optical elements, each optical element being operative to focus a portion of the collimated beam onto or into a sample and to recollimate a portion of the light received from the sample (e.g., scattered light), and wherein the etendue contributed by the optical elements results in a combined etendue that is substantially similar to the system etendue. As such, the contributions of the light recollimated by the individual optical elements are integrated and averaged to form the collection beam.

According to the present disclosure, the array of closely packed optical elements have spherical or aspherical surfaces. In an embodiment, the array of closely packed optical elements is an array of closely packed lenses or transmissive elements. However, in alternative embodiments, the array of closely packed optical elements may comprise an array of closely packed mirrors or reflective elements. In further embodiments, arrays of lenses and reflective elements may be used together on opposing sides in flow cell configurations and/or for signal amplification involving multiple passes through a sample medium. The array of closely packed mirrors or reflective elements may be on-axis with a respective one of the lenses or transmissive elements.

In embodiments of the present disclosure, the closely packed optical elements may be arranged in hexagonal, linear, radial or other packing geometries. The array may be implemented as an integrated panel, which may be flat or curved. Such panels may be constructed of glass or plastic materials, and the panels may be molded and/or micromachined. The plurality of optical elements may form part of a remote optical measurement probe or may be incorporated into a flow cell. While described in terms of Raman analysis, the systems and methods described herein may be used in conjunction with fluorescent measurement systems with appropriate engineering modification.

Figure 2:
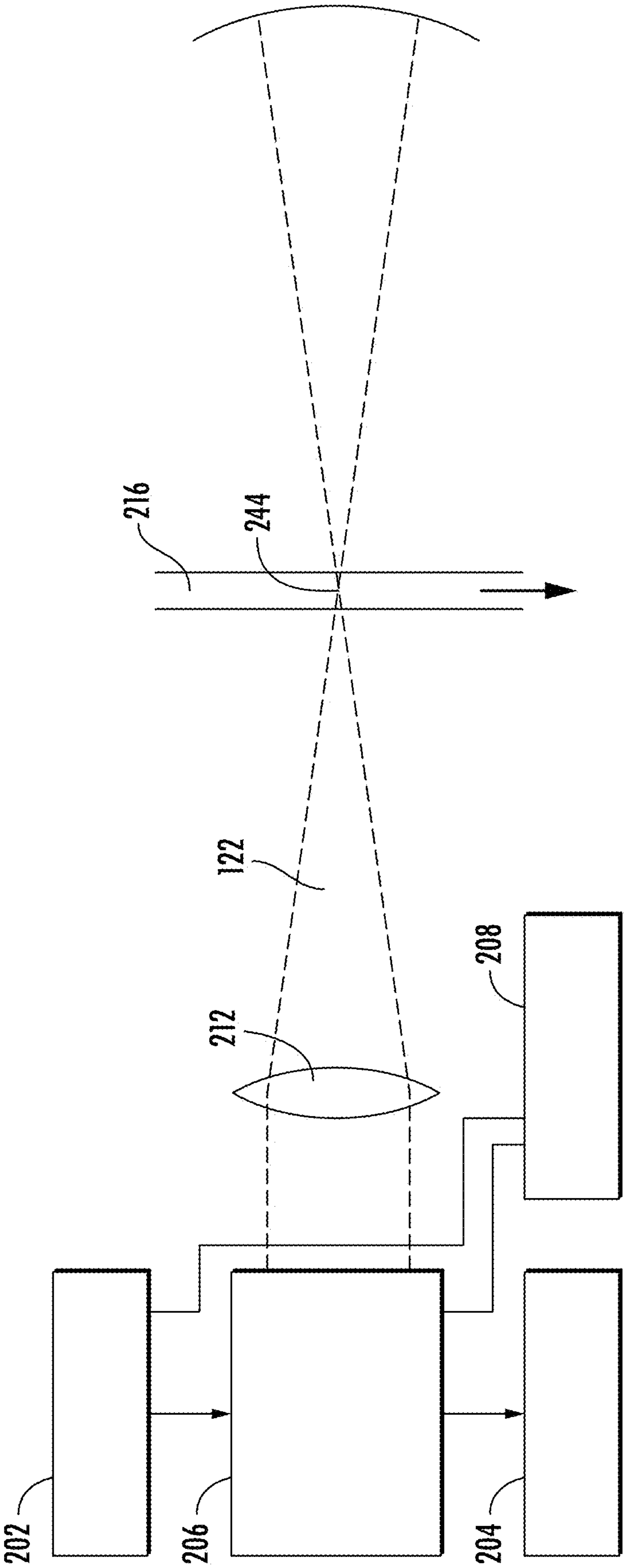
FIG. 2 (PRIOR ART)
FIG. 2 illustrates a schematic simplified block diagram of a Raman flowcell from the prior art.
Figure 3:
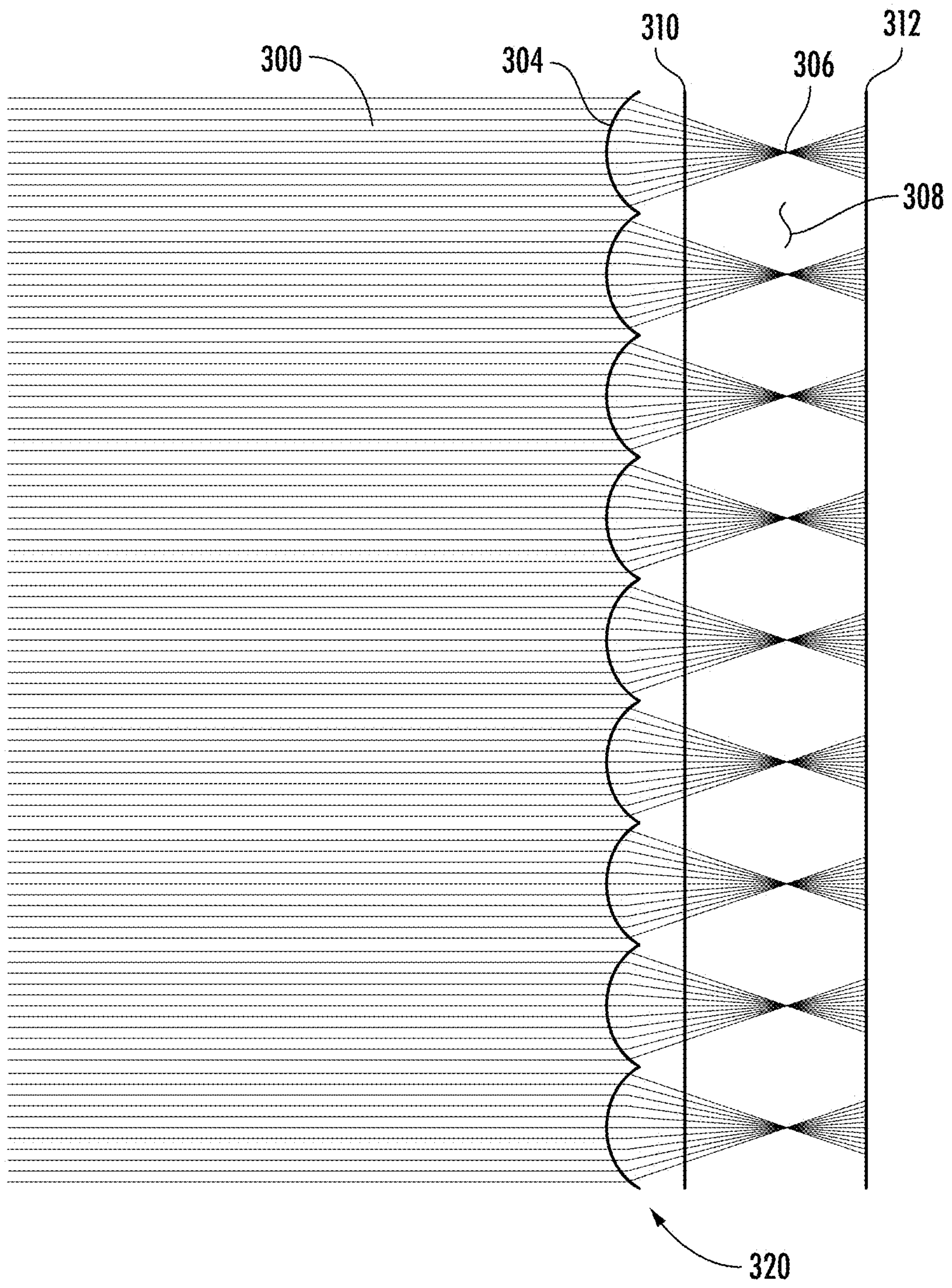
FIG. 3 shows a cross-section of an embodiment of the present disclosure using an array of plano-convex lenses.

Having discussed certain background considerations with respect to FIGS. 1 and 2, FIG. 3 shows a cross-section of an embodiment of an array 320 of plano-convex (PCX) lenses 304 according to the present disclosure. Numerical reference 300 may represent the collimated excitation-collection beam exiting a probe, such as the beam 122 shown in FIG. 1, with the understanding that the embodiments described herein are not limited to any particular probe design and, indeed, may be used in conjunction with 'direct-coupled' Raman spectroscopic systems, including arrangements without fiber coupling.

As shown in FIG. 3, the excitation-collection beam 300 impinges upon the array 320 of multiple convex lenses 304, each focusing a portion of the beam 300 to a point 306 in a sample medium 308. As discussed in further detail below, the lens surfaces 304 may be spherical or aspherical and, in certain embodiments, the array 320 may include other optical elements. The sample medium 308 may be solid, liquid, semi-liquid (such as slurries) or gaseous and the present disclosure may be used in any application, implementation or configuration that a conventional, single objective is used, including flow cells, in situ process monitoring and control.

Figure 11:
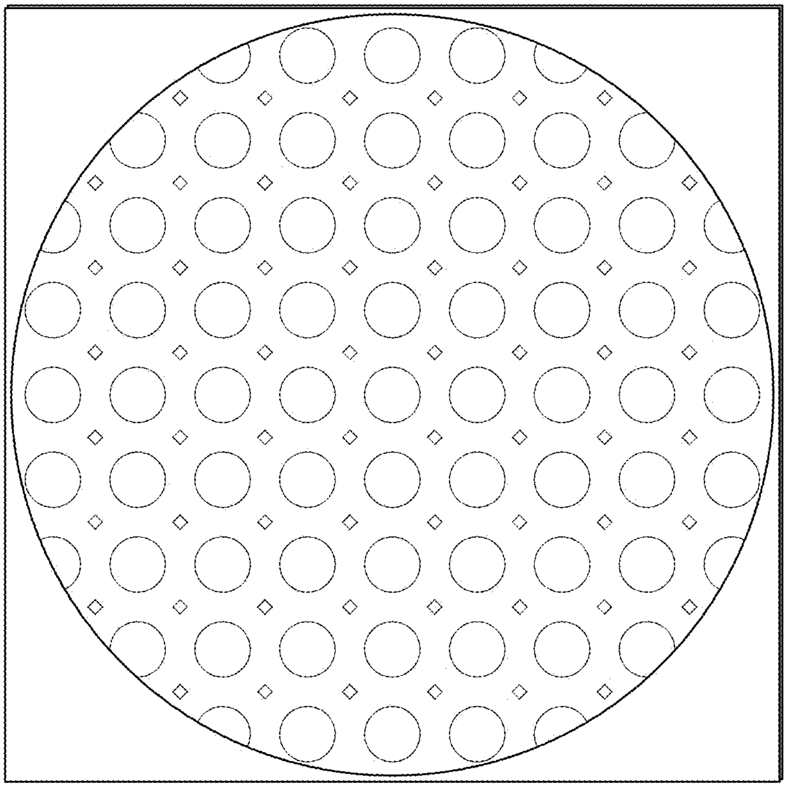
FIG. 11 is an on-axis view of a linear packing arrangement according to the present disclosure.
Figure 10:
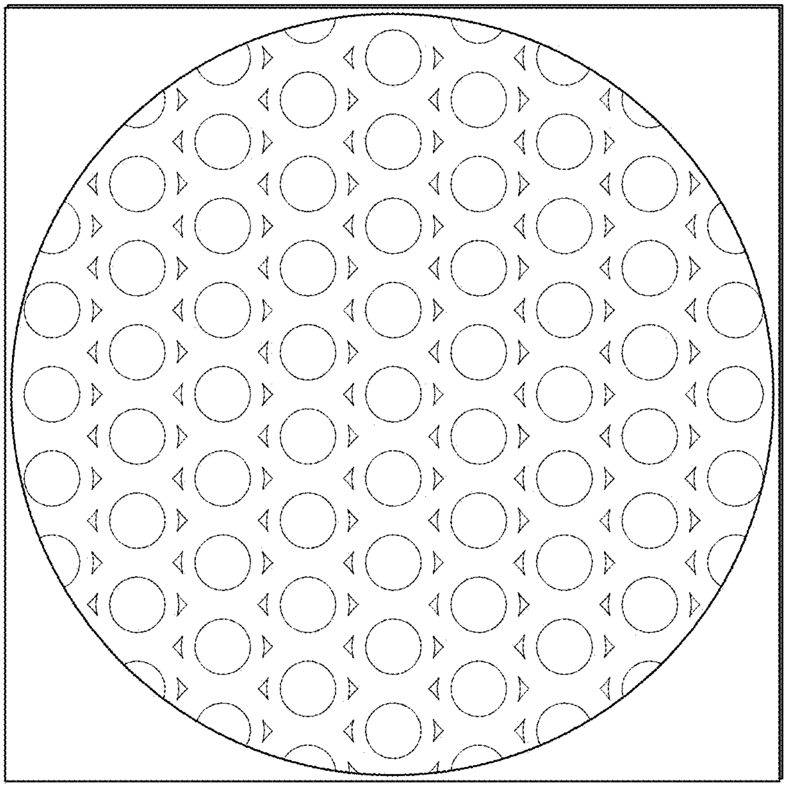
FIG. 10 is an on-axis view of a hexagonal, close-packed array of lens elements according to the present disclosure.

As with the single element objective 124 of FIG. 1, the array 320 of lenses 304 is configured to cover the aperture of the counter-propagating excitation-collection beam in its entirety, as depicted in FIGS. 10 and 11. As such, the focusing and recollimation functions of each lens 304 are spatially separated, as defined herein by the micro-lens array 320. In the case of a relayed fiber image into sample space, for example, the fiber 102, each lens 304 is imaging only a small portion of the fiber object, distributing the object into an array of image slices. Each lens's individual etendue is therefore fractionally smaller, but when summed, the individual etendues equal a total etendue for the system. As a consequence, the total etendue is preserved while affording improved excitation and collection characteristics, including inherent signal integration and averaging.

In an embodiment, all of the lens elements 304 have the same focal length, such that the points 306 form a plane within the sample volume. Nonetheless, a plane of sample points 306 or regions need not be flat, as the array 320 may be curved to conform with a particular shape of form of the sample, such as pharmaceutical tables, physiological tissue, and the like. Indeed, in further embodiments, the foci of the lens 304 may be engineered to focus to a defined surface (either physical or numerical) as opposed to a plane.

As discussed herein, the lenses 304 of the array 320 may be spherical or aspheric, and the array 320 may be fabricated with any suitable technique using any suitable materials, including glass, polymers and combinations thereof, with or without surface coatings. Manufacturing techniques may include molding, stamping, micromachining, each with or without polishing. The choice of manufacturing technique and materials are to be selected in accordance with desired collection efficiency, sample index matching and other engineering considerations known to those of skill in the art.

While not evident in FIG. 3, the lens elements 304 extend into and/or out of the page, forming a two-dimensional array as better seen in the on-axis views of FIGS. 10 and 11. Further, while a transmissive panel with a two-dimensional array 320 of convex surfaces 304 is shown in FIG. 3, more broadly the array may be refractive, diffractive, or reflective. In such embodiment, the elements 304 may be micro-mirrors. As mentioned, spherical as well as aspherical surfaces may be used, as well as Fresnel and holographic implementations of the elements 304.

The selection of spherical versus aspherical surfaces 304 for the array 320 may be used to adjust the size of the focus regions in the sample, from points 306 to more spread areas. The use of aspherical solutions, in particular, may be configured for near-diffraction-limited performance in certain embodiments.

In operation, each optical element 304 of the array 320 acts as an independent objective, focusing the combined excitation-collection beam 300 into the sample 308. The numerical apertures of each element 304 may be comparable to conventional, single-element objectives, but with certain advantages over standard objectives. For example, one distinct advantage is that the array 320 of elements 304 inherently averages the sample interrogation over a larger spatial region of the sample 308. This averaging effect maintains etendue characteristics of a single-focus solution by spatially integrating multiple, smaller spots 306. Moreover, the use of a lens array 320 as opposed to a single objective may also prove less sensitive to inhomogeneities in the sample such as bubbles, surface imperfections, and the like.

The Raman effect is inherently polychromatic. Due to this nature, optical systems involved in collecting the Raman scattered light must take into effect the chromatic aberration involved as light propagates through any medium. All transmissive optical components exhibit chromatic effects through refractive index variation. Reflective optics, on the other hand, direct light by reflection, which aside from chromaticity in the reflection coefficient, operate achromatically to focus light. Additionally, while more sensitive to angular alignment, reflective optical solutions typically produce lower background signatures in Raman analysis since the light is not transmitting through a bulk material. Whereas FIG. 3 shows divergent cones 310 after the sample points 306, in alternative embodiments, an array of mirrors or reflective surfaces, either spherical or aspheric, that focus into the sample may be substituted for the lenses 304. Such embodiments are more achromatic and exhibit lower background noise.

Figure 4:
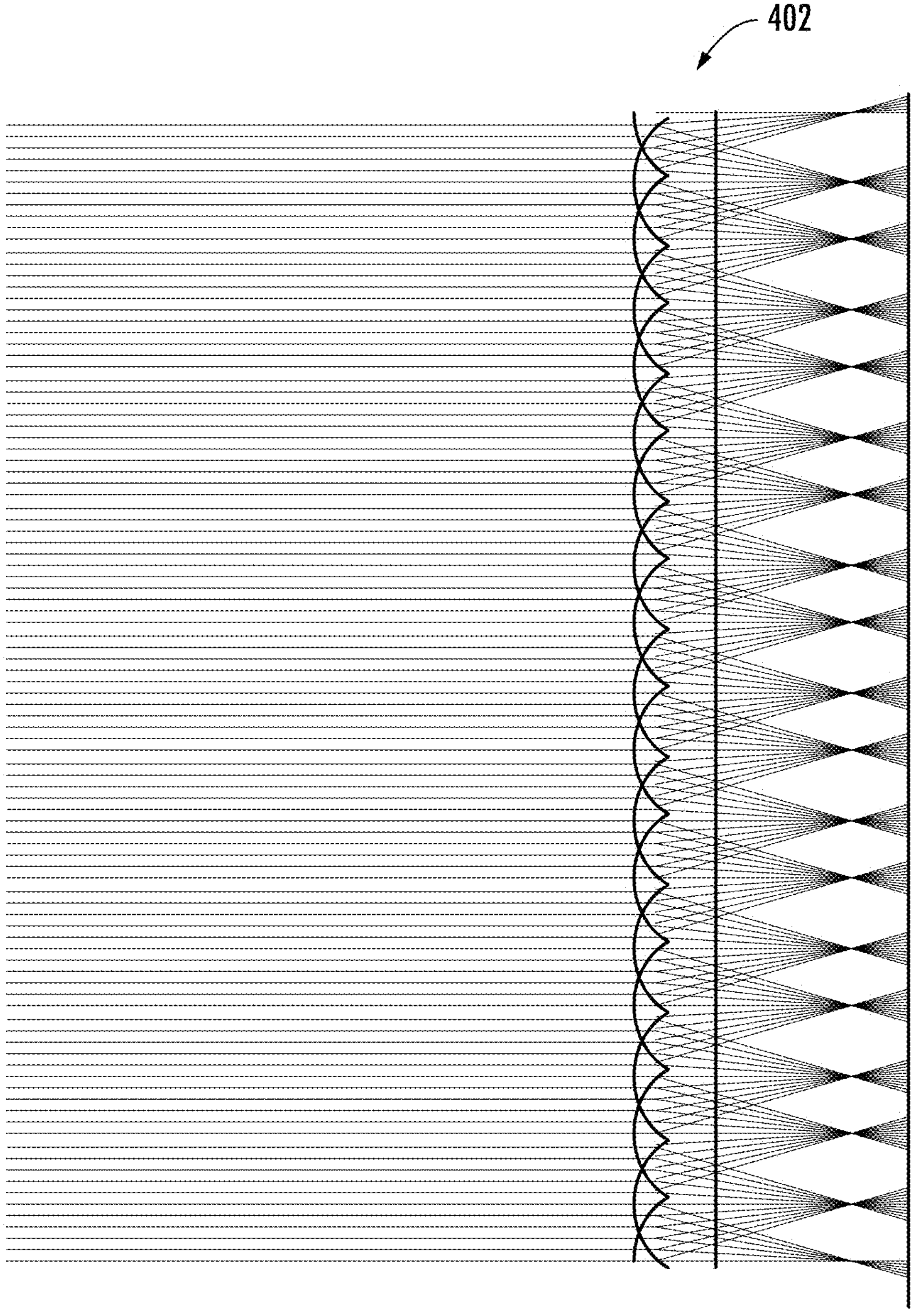
FIG. 4 shows a cross-section of an embodiment of the present disclosure incorporating an array of staggered lenses that may for spatially offset Raman collection.

FIG. 4 is a cross-section of an embodiment of the present disclosure incorporating an array of staggered lenses 402. Such embodiments may facilitate a variation of spatially offset Raman spectroscopy (SORS), enabling sub-surface chemical analysis through tissue, coatings, containers and the like. Whereas conventional SORS uses at least two Raman measurements, one at the source and one at an offset position (e.g., a few millimeters away), with the two spectra can being subtracted, the staggered micro-lens arrays of the present disclosure enable obtaining source and offset measurements simultaneously, using software to perform the subtraction operation.

Figure 5:
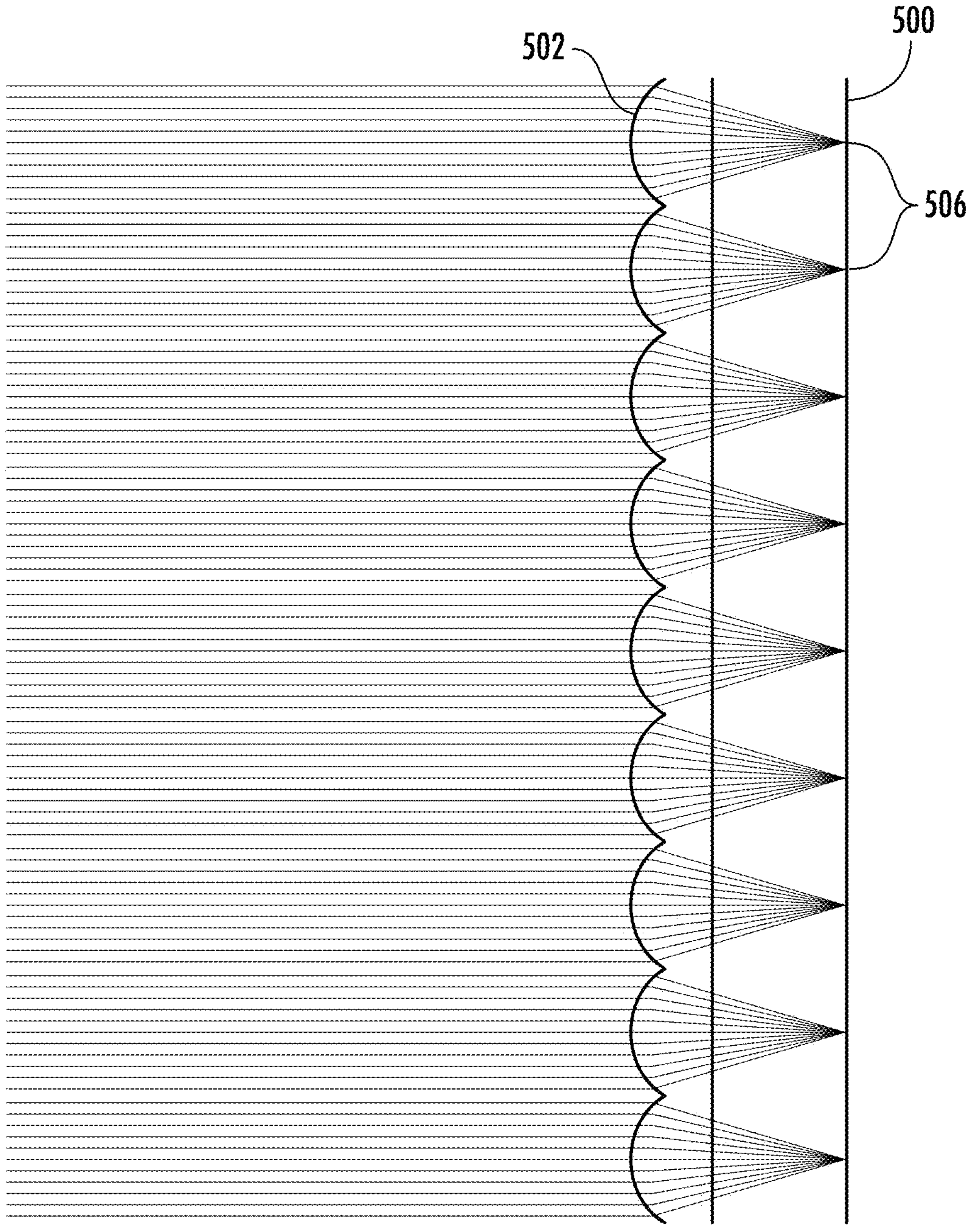
FIG. 5 illustrates use of a planar reflector position aligned proximate to a plane of focal points according to the present disclosure.

The present disclosure also does not preclude the use of signal amplification techniques, which may include any additional optical element or surface used to retro-reflect and/or recollimated the excitation-collection beam to achieve multiple passes through sample foci. As one example, FIG. 5 shows an embodiment of the present disclosure including a planar mirror 500 positioned and aligned proximate to a plane of focal points 506 produced by lens array 502 to reflect the excitation-collection beam back through the foci 506 for recollimation by lens array 502.

Figure 6:
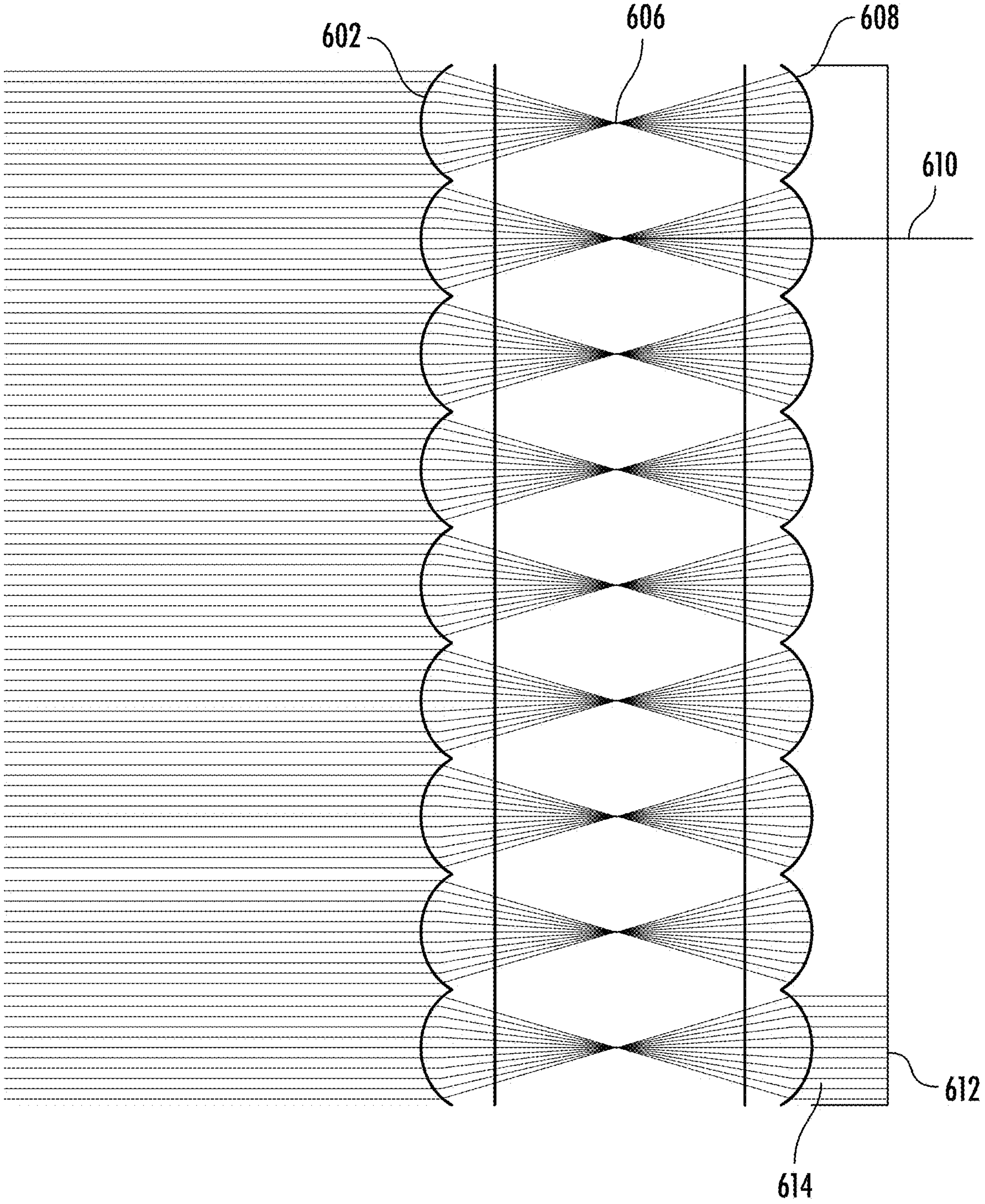
FIG. 6 shows a cross-section of an embodiment of the present disclosure using a mirroring technique to recollimate a plurality of excitation-collection beams.

FIG. 6 shows an alternative embodiment in which a mirror array 608 is positioned and aligned to re-focus the divergent beams passing through foci 606 for re-collimation by lens array 602. In all embodiments that use lens and reflector combinations, each lens of the array 602 is on-axis (depicted by axis 610) with a corresponding reflector of the mirror array 608. The reflective surfaces may be mirrored, as shown, or may comprise transmissive surfaces and a flat reflector 612 configured to redirect the light back through the transmissive surfaces as shown at 614.

Figure 9:
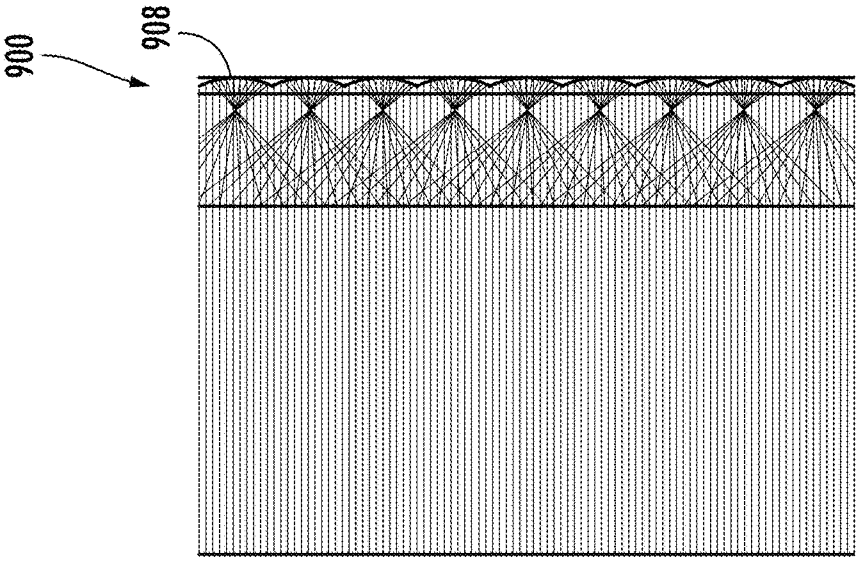
FIG. 9 shows an aspheric pass-through, index-matched configuration according to the present disclosure.
Figure 8:
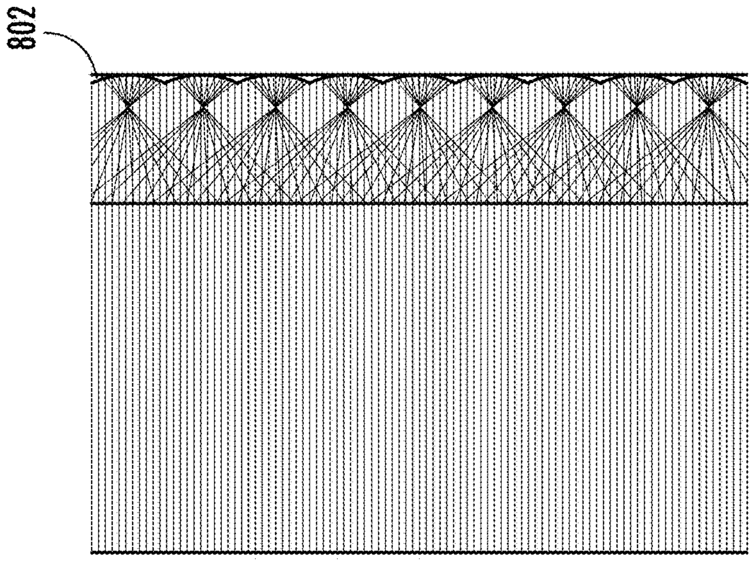
FIG. 8 illustrates the use of the aspheric reflectors immersed in a sample volume according to the present disclosure.
Figure 7:
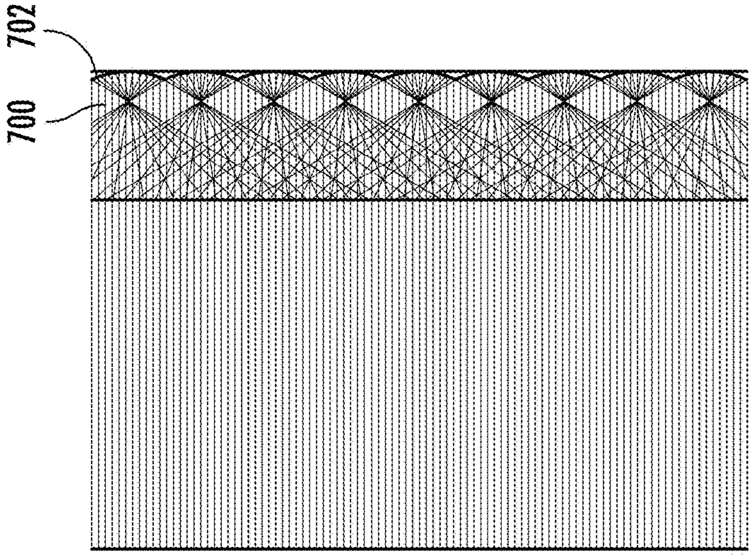
FIG. 7 illustrates the use of spherical reflectors immersed in a sample volume according to the present disclosure.

According to the present disclosure, optical elements such as mirror arrays may also be used for signal amplification and may be placed within a sample volume without the use of micro-lens arrays, as might be the case with certain flow cell implementations. As nonlimiting examples: FIG. 7 depicts the use of spherical reflectors 702 immersed in a sample volume 700; FIG. 8 illustrates the use of the aspheric reflectors 802; and FIG. 9 shows a pass-through, transmissive panel 900 with aspheric reflective surfaces 902. The material used to form the transmissive panel 900 and the aspheric surface geometry of the aspheric reflectors 908 may be adjusted for improved sample index-matching.

As discussed, the lens and mirror arrays of the present disclosure may be fabricated with any suitable technology, and in any lateral arrangement including, without limitation, hexagonal close-packed, linear, radial and asymmetric configurations. As two examples, FIG. 10 is an on-axis view of a hexagonal array of lens elements, and FIG. 11 is an on-axis view of a linear packing arrangement.

I claim:

1. Sampling optics for a spectroscopic system incorporating a collimated beam of light, including an excitation beam and a counter-propagating collection beam, the sampling optics comprising:

an objective optical element comprising an array of closely packed lenses or transmissive elements, each having an optical axis, and an array of closely packed mirrors or reflective elements, each having an optical axis that is on-axis with a respective one of the lenses or transmissive elements, wherein each lens or transmissive element is configured to focus a portion of the collimated beam onto or into a sample and to recollimate a portion of light received at the objective optical element from the sample such that the objective optical element is operative to focus the collimated beam onto or into the sample and to recollimate the light received from the sample, wherein a system etendue is defined with respect to the use of a single objective element, and wherein the array of closely packed lenses or transmissive elements is configured such that etendue contributed by individual array optical elements of the array of closely packed optical elements yields a combined etendue that is substantially similar to the system etendue.

2. The sampling optics of claim 1, wherein the portions of light received from the sample and recollimated by the individual lenses or transmissive elements are integrated and averaged to form the collection beam.

3. The sampling optics of claim 1, wherein:

the closely packed lenses or transmissive elements are disposed on one side of a sample volume; and the closely packed mirrors or reflective elements are disposed on an opposing side of the sample volume.

4. The sampling optics of claim 3, wherein the sample volume is within a flow cell.

5. The sampling optics of claim 1, wherein the closely packed lenses or transmissive elements are arranged in one of the following array configurations: hexagonal, linear, and radial.

6. The sampling optics of claim 1, wherein the array of closely packed lenses or transmissive elements is configured as an integrated panel.

7. The sampling optics of claim 6, wherein the panel is flat or curved.

8. The sampling optics of claim 4, wherein the objective optical element comprising the array of closely packed lenses or transmissive elements is integrated into the flow cell, and wherein the closely packed mirrors or reflective elements are also integrated into the flow cell.

* * * * *